United States Patent [19]

Daifotes

[11] Patent Number: 4,572,108

[45] Date of Patent: Feb. 25, 1986

[54] COMPACT, ANIMAL-OPERATED ANIMAL FEEDER

[76] Inventor: Theodore S. Daifotes, P.O. Box 383, Oak Hill Acres, Tuolumne, Calif. 95379

[21] Appl. No.: 619,300

[22] Filed: Jun. 11, 1984

[51] Int. Cl.⁴ .............................................. A01K 5/00
[52] U.S. Cl. ...................................... 119/51 R; 119/62
[58] Field of Search ................... 119/51 R, 56, 54, 55, 119/19, 62

[56] References Cited

U.S. PATENT DOCUMENTS

| | | | |
|---|---|---|---|
| 3,121,419 | 2/1964 | Gillespie | 119/62 |
| 3,180,321 | 4/1965 | Aldinger | 119/51 R |
| 3,301,219 | 1/1967 | Hellekson | 119/55 |
| 3,465,724 | 9/1969 | Broadbent | 119/51 R |
| 3,541,995 | 11/1970 | Fathauer | 119/51 R |
| 3,557,757 | 1/1971 | Brooks | 119/51 R |
| 3,575,141 | 4/1971 | Elkins | 119/55 |
| 3,785,348 | 1/1974 | Pelidori, Sr. et al. | 119/62 |
| 3,850,145 | 11/1974 | Yoder et al. | 119/51 R |
| 4,036,178 | 7/1977 | Lee et al. | 119/51 R |
| 4,162,683 | 7/1979 | Brooks | 119/51 R |
| 4,188,912 | 2/1980 | Smalley | 119/51 R |
| 4,421,058 | 12/1983 | Paul | 119/19 |
| 4,426,955 | 1/1984 | Monroe et al. | 119/51 R |

*Primary Examiner*—Hugh R. Chamblee
*Attorney, Agent, or Firm*—Manfred M. Warren; Robert B. Chickering; Glen R. Grunewald

[57] ABSTRACT

A compact, animal-operated animal feeder is disclosed in which the feeder housing has a pair of foldable doors mounted over a feed opening and latched in a closed position. The doors can be unlatched by the animal, which carries a latch release device about its neck, and the natural tendency of the animal to push toward the feed will fold the doors laterally to an open position permitting access to food inside the feeder. A magnetic latch release assembly in which a plurality of permanent magnets are arranged in an array to provide a key for release of a latch having correspondingly arranged magnets is also disclosed. A compound door including a magnetically releasable latch assembly is also disclosed.

16 Claims, 12 Drawing Figures

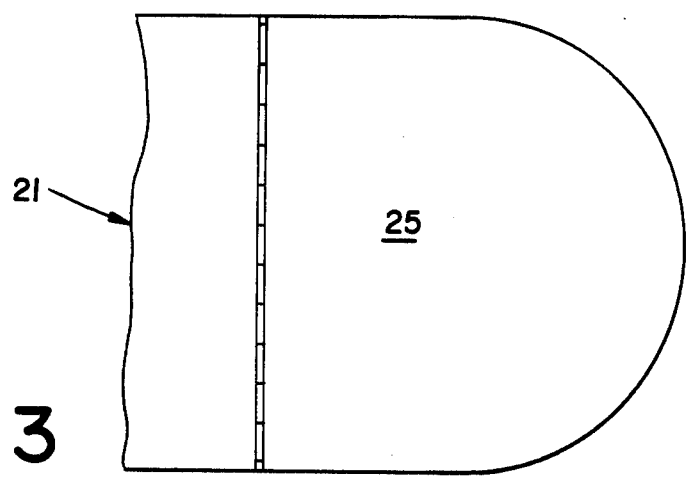
FIG_3
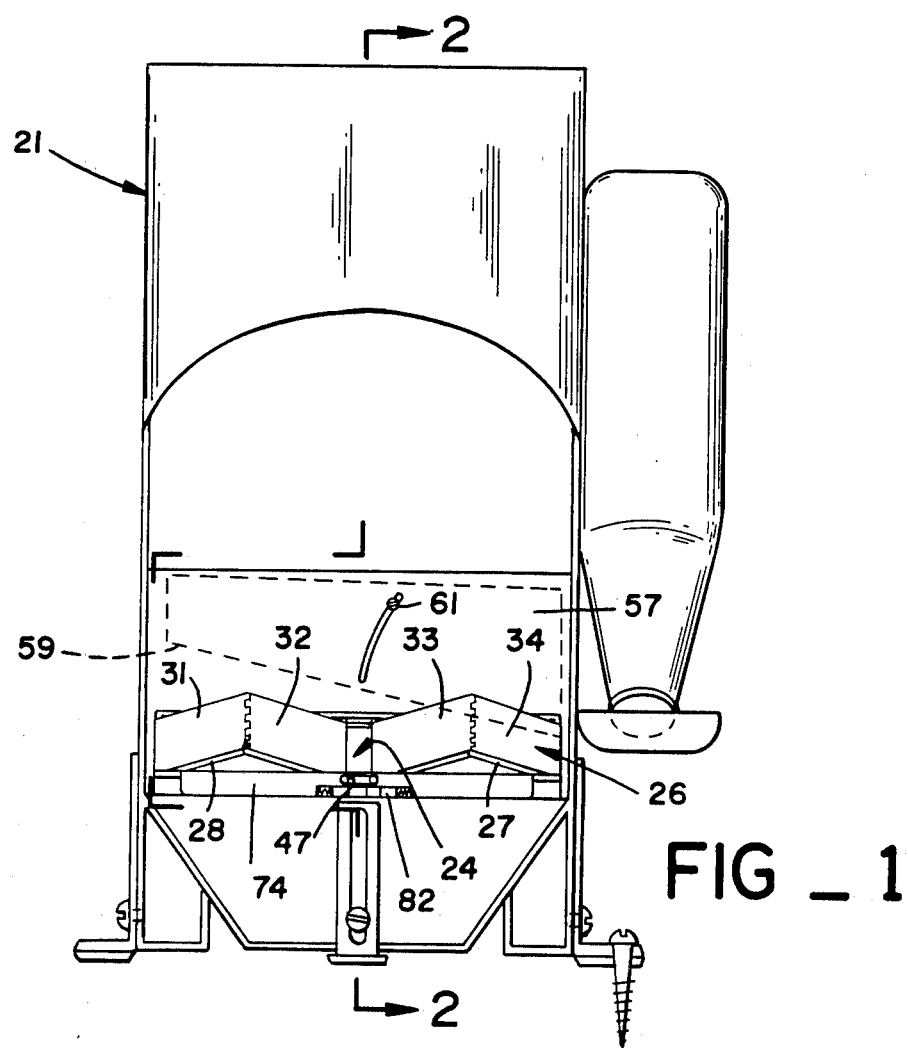
FIG_1

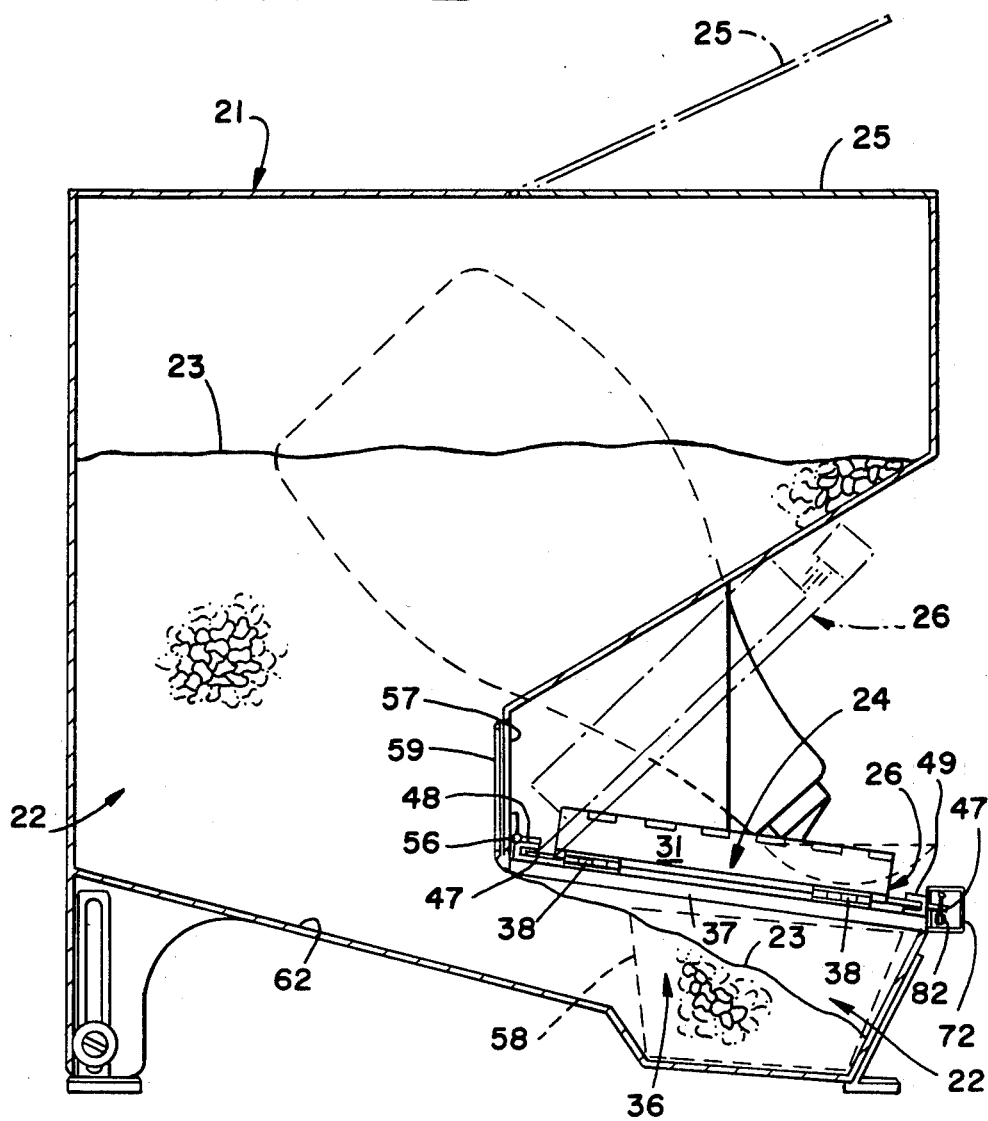
FIG_2
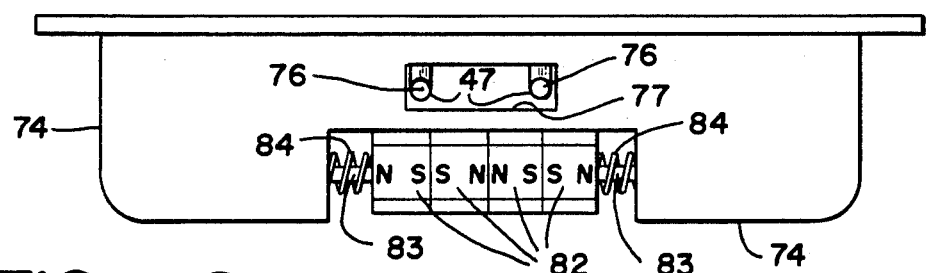
FIG_8

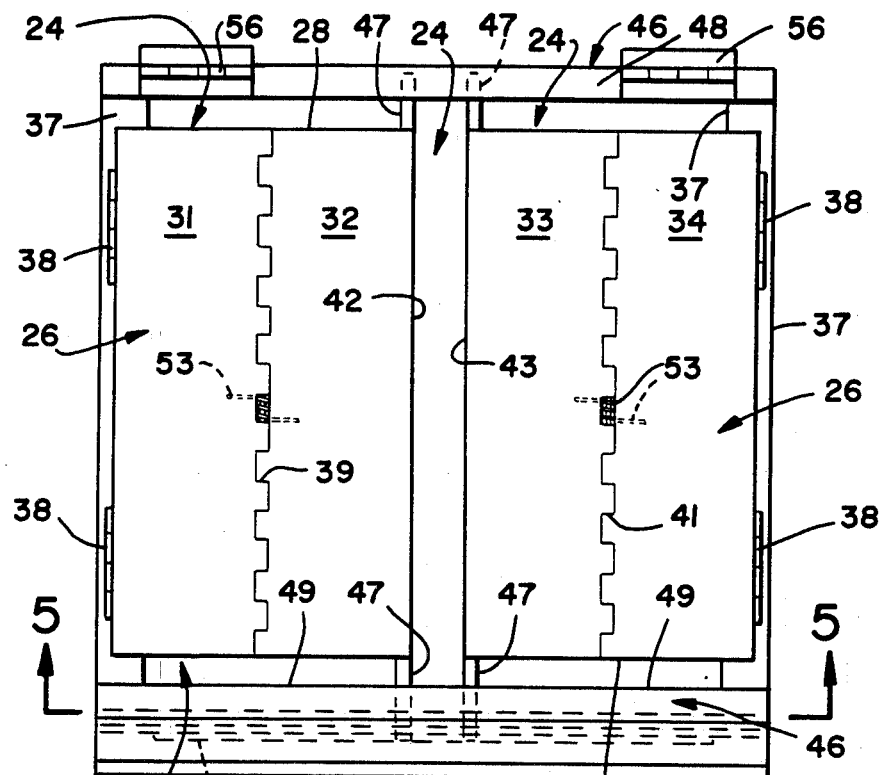
FIG_4
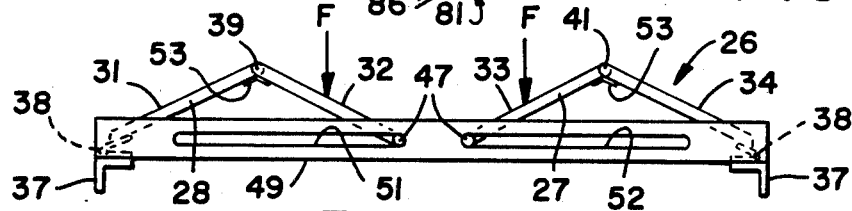
FIG_5
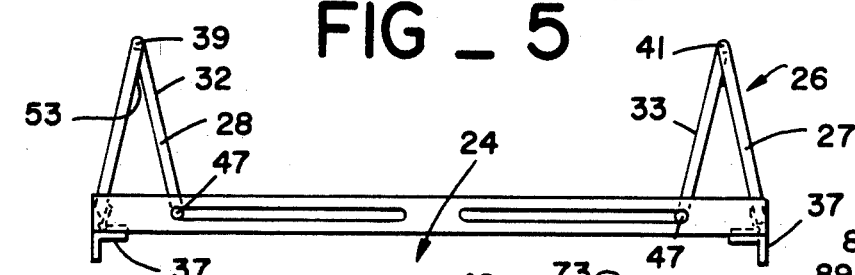
FIG_6
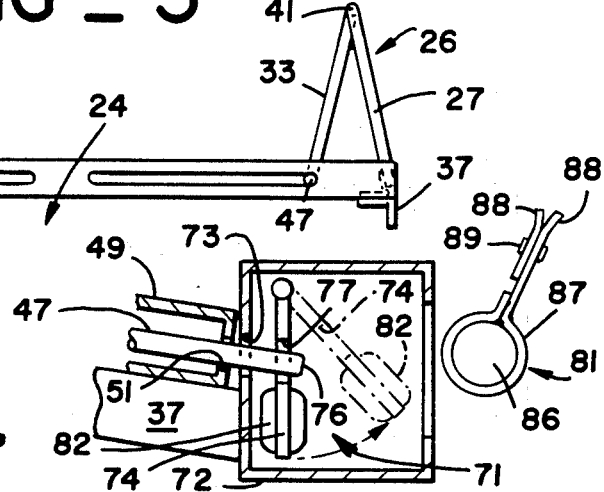
FIG_7

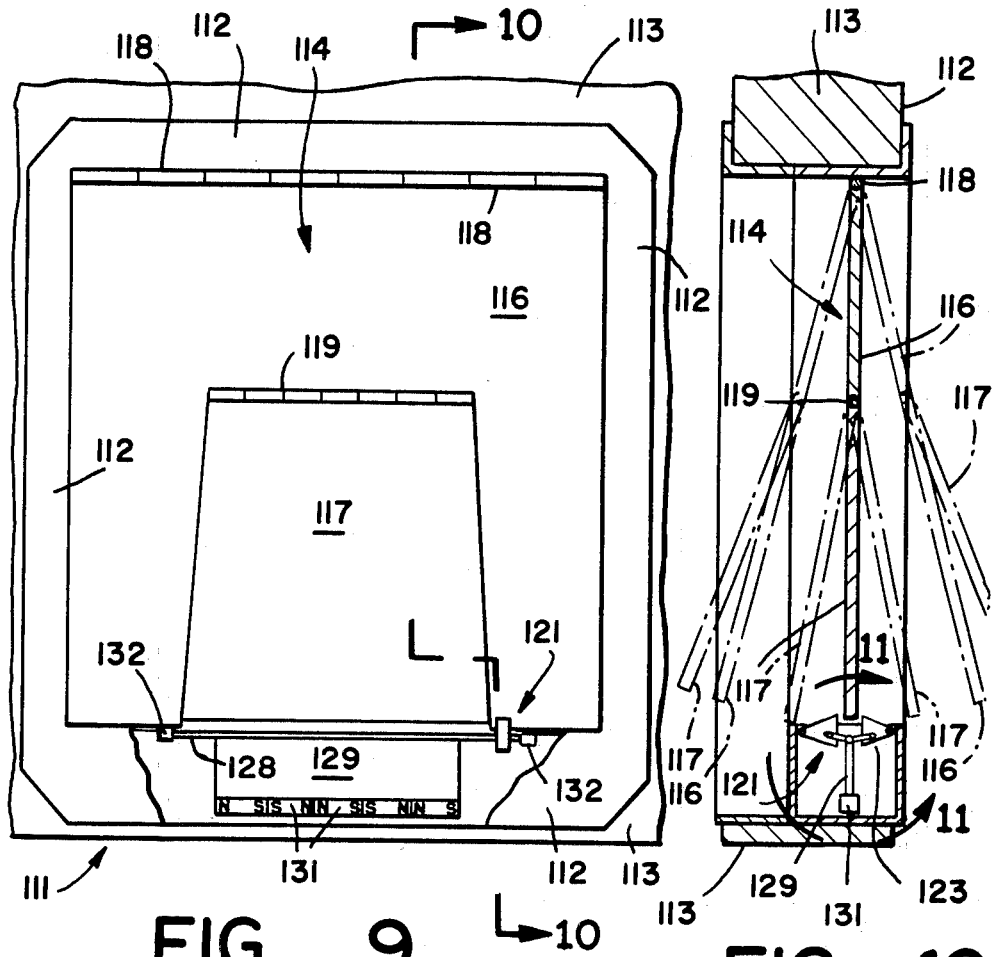
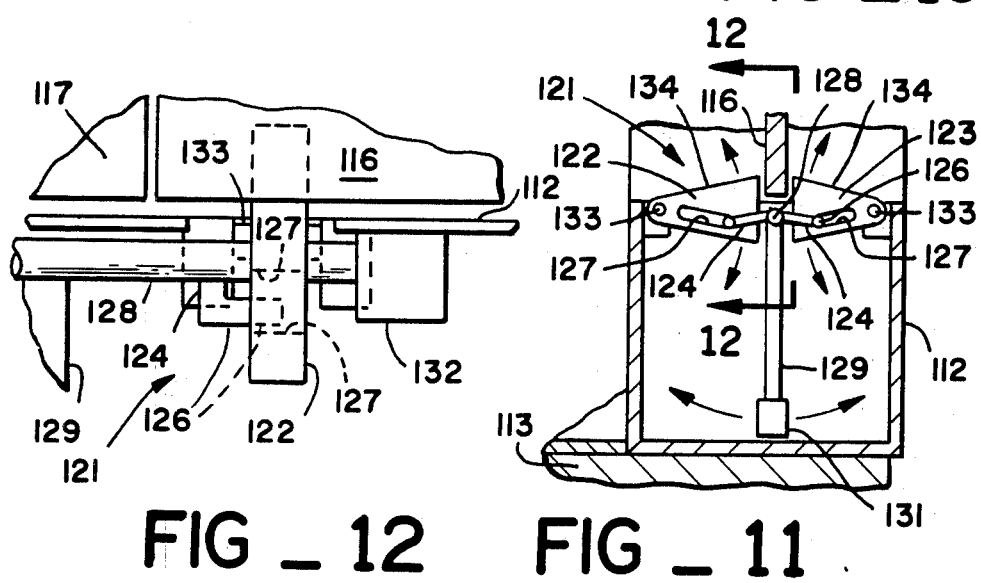
FIG_9  FIG_10  FIG_12  FIG_11

COMPACT, ANIMAL-OPERATED ANIMAL FEEDER

BACKGROUND OF THE INVENTION

The present inventions relates, in general, to animal feeders, and more particularly, to animal-operated feeders which include a latch assembly and a latch release element worn by the animal, usually around its neck.

Various types of animal feeders have been developed which can be automatically operated by the animals on an as-needed basis. One approach which is commonly employed is the treadle operated animal feeder. Typical of such treadle-type animal feeders are the devices of U.S. Pat. Nos. 3,121,419, 3,301,219, 3,575,141 and 3,758,348. In these devices a barrier such as a lid, door, gate or panel is movably mounted to a housing or enclosure in which feed for the animal is positioned. A treadle or platform is coupled to the movable barrier and is positioned in front of the feed opening so that as the animal approaches the feed opening it must step on the treadle and thereby move the barrier.

These treadle-based devices have certain inherent disadvantages. First, they sometimes require relatively involved mechanisms. Additionally, the movement of the treadle under the animal's feet can scare the animal away from the feeder. Moreover, the feeders of the above prior-art do not provide any means for discriminating between animals. Thus, two animals of substantially the same size can operate the feeder, even though the feed may not be intended for one of the animals.

A second approach to animal-operated feeders can be found in U.S. Pat. Nos. 3,541,995, 3,557,757, 3,850,145, 4,036,178 and 4,162,683. All of these patents address the problems of selective feeding, so that only authorized or selected animals are able to operate the feeder, or demand feeding, so that excess feed is not available to other animals. For household pets, for example, the owner will want to feed only his or her animals, not the animals next door. Similarly for cattle and large animals, some animals may need one kind of feed and/or medication in the feed, while others feed on a different regimen. In both domestic and farm applications the animal owners do not want excessive feed available after the animal finishes eating. The feeders of these patents, therefore, provide the animals with a key or switch actuating device which will turn on a feed conveyor when the animal positions the key proximate to the switch at the feeder. A variety of magnetic and radio frequency actuated switch devices have been employed in the feeders.

Animal feeders which are based on conveyors and an animal carried switch actuator also have been found to have certain disadvantages. First, the switching on and off and operation of the conveyor can scare the animals. Secondly, some of the systems require complex electronic apparatus. Additionally, most of these systems require an electrical power source, which is not always feasible to provide and will result in failure to feed the animal if there is a power failure.

Finally, animal-operated animal feeders have also included feeders in which the animal carries a key which will unlatch a barrier or gate to permit the animal to have access to food in the feeder. Typical of such prior-art devices are the animal feeders of U.S. Pat. Nos. 3,180,321, 4,036,178 and 4,188,912.

In U.S. Pat. No. 3,180,321 a battery operated oscillator mounted around the animals neck can be used to actuate a radio receiver at the feed structure so that a gate powered by an electric motor is raised to permit the animal to have access to the feed. This structure has the disadvantages of cost, possible power failure and inherent complexity.

The animal feeder of U.S. Pat. No. 4,036,178 includes a transponder attached to the animal which is passive and replys to an interrogator to either operate a latch or dispense food. Again, this is an electrically powered solution which is relatively complex and inherently costly.

In the U.S. Pat. No. 4,188,912 a solonoid operated latch is provided which is actuated by a proximity switch that will be closed by a metal chain, or the like, worn by the animal. While the problem of conveyor noise has been eliminated by this releasable gate structure, it again must be battery powered with inherent potential for power failure, which could be disastrous if the feeder is used in remote or unsupervised locations. Additionally, the barrier gate which is moved by the animal is pushed inwardly of the feeder housing, and the feed inside the housing can interfere with the operation of the gate.

OBJECTS AND SUMMARY OF INVENTION

A. Object of the Invention

Accordingly, it is an object of the present invention to provide an animal feeder which is animal-operated and can be used to distinguish between authorized and unauthorized animals.

It is another object of the present invention to provide an animal feeder which is compact, easily operated by the animal, does not require an electrical power source, and has enhanced reliability of operation.

A further object of the present invention is to provide an animal feeder which can be operated by the animal with little effort and no training so that the animal's natural instinct to move toward feed is employed to unlatch and open the feeder.

Still a further object of the present invention is to provide an animal feeder having a movable barrier that does not impair or reduce the effective feed volume of the feeder during movement to permit the animal access to the feed volume.

Another object is to provide a latch assembly and release therefor which can be employed in a variety of door structures to enable authorized animals to move in and/or out of the door.

The compact, animal-operated animal feeder of the present invention has other objects and featues of advantage which will become from and are set forth in more detail in the following description of preferred embodiment and the accompanying drawing.

B. Summary of the Invention

The compact, animal-powered feeder of the present invention includes enclosure means or a housing defining a feed volume and formed with a feed opening therein, and barrier means mounted to the enclosure for movement by the animal from a closed position extending across the feed opening to an open position permitting access by the animal through the feed opening to the feed volume. The improvement to the animal feeder is comprised, briefly, of the barrier being formed as a foldable door assembly having a plurality of articulated door panels movable mounted to said enclosure means for lateral folding movement from the closed position to the open position, with the door assembly being partially folded in the closed position so that an inward force supplied by said animal against the door assembly will fold the door assembly laterally to the open position. The door assembly is further preferably positioned outwardly of the feed volume of the animal feeder at all times during folding movement so that opening and closing of the door assembly does not interfere with or restrict the feed volume of the animal feeder. The animal feeder also preferably includes releasable latch means formed to latch the door assembly against the opening in the closed position and latch release means formed for carrying by the animal and formed to release a latch when position proximate the latch. Most preferably the latch means and latch release means are provided as cooperative magnetic elements formed for displacement of the latch against gravity biasing upon positioning of the latch release means proximate the latch.

An additional aspect of the present invention is the utilization of animal-powered releasable latch means in an animal entry door. The animal entry door includes a door assembly having a frame mounted in the entry door to a building and barrier means movably mounted with the frame for movement by the arrival from a closed position substantially flush with the frame to an open position, thereby permitting access by the animal through the building door. The improvement to the foregoing animal entry door is comprised of the barrier being formed as two articulated door panels, a first door panel movably mounted to the frame and a second door panel movably mounted to the first door panel. Releasable latch means are mounted to latch the first door panel to the frame in the closed position and are formed to release by latch release means carried by the animal. As noted in relation to the animal feeder of the present invention, preferably the latch means and latch release means are provided as cooperative magnetic elements formed for displacement of the latch against gravity upon positioning of the latch release means proximate the latch. This is effected by the animal's placement of it's head through the second door panel, thereby positioning the latch release means carried by the animal, typically about its collar, proximate the latch.

DESCRIPTION OF THE DRAWING

FIG. 1 is a front elevational view of an animal feeder constructed in accordance with the present invention with the front housing for the latch assembly removed.

FIG. 2 is a side-elevational view in cross-section taken substantially along the plane of line 2—2 in FIG. 1.

FIG. 3 is a fragmentary, top plan view corresponding to FIG. 2.

FIG. 4 is an enlarged, top plan view of the folding door assembly of the feeder of the present invention.

FIG. 5 is a front elevational view taken substantially along the plane of line 5—5 of the folding doors of FIG. 4 in a closed position.

FIG. 6 is a front elevational view corresponding to FIG. 5 with the doors in an open position.

FIG. 7 is a fragmentary, enlarged, side elevational view in cross-section the latch release assembly for the doors of the animal feeder of the present invention.

FIG. 8 is a front elevational view of the movable latch release element of FIG. 7.

FIG. 9 is a front elevational view, partially broken away, of an animal entry door constructed in accordance with the present invention.

FIG. 10 is a side elevational view in cross-section taken substantially along the plane of line 10—10 in FIG. 9.

FIG. 11 is an enlarged, fragmentary side elevation view of the area within line 11—11 in FIG. 10.

FIG. 12 is an enlarged, fragmentary front elevational view taken substantially along the plane of line 12—12 in FIG. 11.

DESCRIPTION OF THE PREFERRED EMBODIMENT

Referring now to FIGS. 1 and 2, the animal feeder of the present invention can be seen to include enclosure means, generally designated 21, defining a feed volume 22 into which animal feed 23 can be placed. The enclosure is further provided with a feed opening 24 across which barrier means, generally designated 26, is disposed. Enclosure or housing 21 also preferably includes an opening for loading feed into the housing and a latched lid 25 pivotally mounted across the loading opening. As is typical of animal-operated animal feeders, the barrier means 26 is formed and mounted for movement by the animal from a closed position, shown in FIGS. 1, 2, 4 and 5, in which the barrier extends across feed opening 24, to an open position, shown in FIG. 6, in which the barrier has been moved to permit access by the animal through feed opening 24 to feed volume 22.

Typically prior art animal-operated feeders which have movable gates or barriers either employ an electrical motor to power the gate, or a gate structure which can be moved by the animal by a treadle, or a gate that can be moved by the head of the animal inwardly of the feed housing or enclosure.

In order to provide an animal-operated, unpowered animal feeder which is compact and does not require displacement of barrier means 26 into feed volume 22, the animal feeder of the present invention is provided with a barrier means 26 formed as a foldable door assembly, and preferably two foldable doors 27 and 28. Each of doors 27 and 28 includes a plurality, in this case, two, articulated door panels 31, 32, 33 and 34, which are formed for lateral folding movement from the closed position of FIG. 1 to the open position as shown in FIG. 6.

In order to facilitate lateral displacement of doors 27 and 28, it is preferable that in the closed position doors 27 and 28 are partially folded so that an inward force F (FIG. 5) by the nose of the animal will produce a lateral component that will easily slide or fold the doors to the open position. As best may be seen in FIGS. 5 and 6, the folding movement between the closed and open positions takes place with the door panels all being disposed outwardly of the feed volume. Thus, the animal pushes inwardly toward feed 23, but the doors fold laterally, and to some degree outwardly, as they part. This enables the barrier means in the animal feeder of the present invention to be positioned in close proximity to the feed, in this case in a substantially horizontal orientation immediately above the lower trough or tray portion 36 of the feed volume 22. The feed in feed volume 22, and particularly front trough portion 36 of the feed volume, will not interfere with either opening or closing of the door assembly 26.

In a preferred form of the folding assembly of the present invention, each folding door is pivotally secured to a frame member 37, for example, by hinge means 38, for rotation about a first axis. Frame members 37 are positioned approximate opposite sides of feed opening 24, and the folding doors 27 and 28 extend outwardly to a position proximate the middle of opening 24. Panels 31-34 are pivotally connected to each other about second axis or hinge pins 39 and 41 which are substantially parallel to the first axis or hinges 38.

It is possible to form panels 31-34 from a transparent material so that the animal can see the feed positioned beyond the barrier, but alternatively or additionally it is also possible to form the feeder with the free ends 42 and 43 spaced apart from each other in the closed position so as to define a slot through which the animal can see the feed.

Smooth guided movement of the door assembly across feed opening 24 is provided by guide means, generally designated 46, positioned at each end of the folding doors. Protruding from opposite sides of the free ends 42 and 43 of the folding doors are guide elements 47. The guide means 46 can advantageously be formed as C-shaped channels 48 and 49 into which the rod-like protrusions 47 extend, although other guide tracks or channels can also be employed. C-shaped channel 49, however, is preferably further slotted at 51 and 52 to receive guide rods 47 therethrough to provide a latch, as will be described in more detail hereinafter. With the free end of doors 27 and 28 being guided by guide means 46, folding movement of the doors is very smooth and can be easily accomplished even by small animals.

Return of the folding door structure to the closed position from the open position is preferably accomplished by providing the doors with spring biasing means, for example, torsion springs 53 mounted around hinge pins 39 and 41 in the doors. The force required to open or close the doors in the animal feeder of the present invention is relatively small, and accordingly, the spring biasing force provided by torsion springs 53 need not be great.

In order to facilitate positioning of different kinds of feed in the lower trough portion or volume 36 of the housing, it is preferable that the animal feeder of the present invention be formed so that barrier means 26 is pivotally mounted for movement away from feed opening 24 to permit access to the feed volume. Such pivotal mounting can be provided by hinges 56 mounted on guide channel 48 and secured to the wall 57 of the housing or enclosure. A manually releasable latch (not shown) can be used to latch barrier means or assembly 26 into place, but when the latch is released, the assembly can be moved to the position shown in dotted lines in FIG. 2. This allows a receptacle 58, also shown in dotted lines, to be placed in trough volume 36.

In order to control the amount of feed reaching the lower trough portion 36 of the feed volume 22, it is preferable that a gate 59 having a manually engageable nob 61 (FIG. 1) be mounted to housing wall 57. The user of the feeder can, for example, lower gate 59 so as to control the rate at which feed is gravity dispensed down sloped housing surface 62 to the trough volume 36. Alternatively, when the receptacle 58 is to be placed in trough volume 36, gate 59 can be lowered completely so as to essentially prevent feed 23 from gravitating to trough portion 36 of the feed volume.

It is a further important feature of the animal-operated animal feeder of the present invention to provide a feeder having releasable latch means formed to latch barrier assembly 26 in a closed position and to provide the animal with latch release means formed to enable automatic releasing of the latch when the animal positions the latch release means proximate to the latch. Thus, for applications in which the users wishes to have only authorized animals feed at the feeder, the animal feeder of the present invention includes a releaseable latch structure which can be used as a "key" or latch release means carried by the animal.

The latch means, generally designated 71, of the present invention can best be seen in FIGS. 7 and 8. The protruding rods or guide elements 47 on the free ends of the doors protrude from the slots 51 and 52, as above described, and into a latch housing 72, which is also slotted at 73 with a slot having a length equal to the length slots 51 and 52. Pivotally mounted within housing 72 is a movable latch element 74. The distal ends 76 of guide rods 47 extend through an opening 77 of limited length (best seen in FIG. 8). Movable element 74 is gravity biased to the position shown in solid lines in FIG. 7 at which opening 77 is positioned so as to capture or restrain both guide rods 47 against outward lateral displacement. Until pivotally mounted member 74 is swung to the upward position shown in FIG. 7 in dotted lines, the ends of 47 and accordingly the doors 27 and 28 are held by slot 77 in the closed position.

In order to enable unlatching of the latch assembly 71 of the present invention without the need for an electrically powered system, it is preferable that latch means 71 and latch release means 81 be provided as cooperative magnetic elements formed for displacement of the latch upon positioning of the latch release means proximate the latch by the animal. This displacement occurs against gravity biasing of the latch to the latched position and can be accomplished in several manners. Most preferably, however, a plurality of permanent magnetics 82 are mounted on a rod 83 carried by movable members 74, with compression springs 84 holding the permanent magnetic elements 82 in place. Latch release means 81 is similarly preferably formed with a plurality of magnetic elements 86 which are mounted on rod 90 and supported from a strap 87 formed with a loop 88 which can be snapped by means of snap 89 around the collar of the animal.

The provision of the plurality of permanent magnets 82 and 86 in the latch and latch release assembiles enables the user to employ two or three feeders in the same general area with each animal having a different key so that the feed of each animal can be controlled. One can position the poles of the plurality of permanent magnetic elements in various orientations so that only a similarly keyed latch release means 81 will cause attraction of the magnetic assembly on the movable latch member 47.

As will also be understood, however, it is possible to alternatively provide a permanent magnet for latch release means 81 and a ferromagnetic member 74 for the movable latch element. It is also possible to reverse the parts and provide a magnetic element carried by movable latch member 74 and a ferromagnetic member as the latch release means 81. In any form of the latch of the present invention it is preferable that the housing, frame members, channels and guide rods 47 not be formed of ferromagnetic materials.

Referring now to FIGS. 9 through 12, a compound animal entry door assembly, generally designated 111 is shown. Assembly 111 includes frame means 112 formed for fixably mounting the assembly in door 113, for example, an exterior door to a house. Carried by frame 112 is barrier means, generally designated 114, which is a compound door comprised of first door panel 116 and second door panel 117. As best may be seen in FIG. 10, barrier means 114 is normally gravity biased to a closed position (solid lines), but is movably mounted by pivot 118 so as to enable displacement by the animal in either of two opposed directions (phantom lines) permitting entry and exit of the animal through the building door.

In the door assembly of the present invention first panel 116 is articulated to frame 113 by pivot means 118 and second door panel 117 is pivoted to first panel 116 by pivot means 119. Additionally, the door assembly includes releasable latch means 121 formed and mounted to latch first door 116 to frame 112 in the closed position. As was the case in the animal feeder assembly of FIGS. 1 through 8, latch means 121 is formed for release by latch release means carried by the animal. Such release occurs when the animal applies an inward force to barrier means 114 in a manner which is more fully described below.

In order to prevent unauthorized animals from entering the building by pulling the door assembly toward them, a practice which cats are particularly adept at, the door assembly of the present invention includes a pair of movable latch elements 122 and 123 positioned to engage opposite sides of first door panel 116. Assembly 121 further includes latch release lever means in the form of a pair of arms 124 having lateral projections 126 (FIG. 12) which are slidably received in slots 127 in the movable latch elements. Both of arms 124 are fixed for rotation to shaft 128 to which downwardly depending member 129 carrying magnets 131 is also fixed. Shaft 128 is pivotally mounted by brackets 132, and upon pivoting, arms 124 cause pivoting of latch elements 127 and 123 in opposite directions.

Thus, attraction of magnet assembly 131 toward a magnet carried by the animal will pivot element 129 toward the magnet. This in turn causes pivoting of the latch elements 122 and 123 about pivot means 133 in opposite directions so that the door can only be displaced away from the animal.

In operation, the animal is able to push open second door panel 117, but this panel is dimensioned so as to permit the animal's head to enter, but not the animal's body. As the animal pushes its head into panel 117, the magnet collar or latch release means is positioned proximate magnets 131. This position is shown in FIG. 10 as the first set of phantom lines closet to the solid lines.

Pivoting of the latch element 129 toward the latch release means carried by the animal causes the movable latch element on the remote side of door panel 117 to be depressed and the latch element on the animal's side to be raised. Door panel 117 is thereby released for inward movement, and it is dimensioned so that the animal's body can pass through the opening provided. The second set of phantom lines in FIG. 10 show the door 117 unlatched and moved, with second door somewhat further displaced by the animals head.

As will be seen it is preferable that latch elements 122 and 123 are formed with tapered upper surfaces 134 which will cause relatching when barrier 114 swings by gravity back to the closed position. It should be noted that as door panel 117 passes over a surface 134, the latch element on one side pivots down, while the element on the other side pivots up to insure latching.

What is claimed is:

1. A compact, animal-operated animal feeder including enclosure means defining a feed volume and formed with a feed opening therein, and barrier means mounted to said enclosure means for movement by said animal from a closed position extending across said feed opening to an open position permitting access by said animal through said feed opening to said feed volume, wherein the improvement in said animal feeder is comprised of:
   said barrier means being formed as a foldable door assembly having a plurality of articulated door panels movably mounted to said enclosure means for lateral folding movement from said closed position to said open position, said door assembly being partially folded in said closed position so that an inward force applied by said animal against said door assembly will fold said door assembly laterally to said open position.

2. The animal feeder as defined in claim 1 wherein, said door assembly is formed for folding movement between said closed position and said open position with said door assembly being disposed outwardly of said feed volume during said folding movement.

3. The animal feeder as defined in claim 2 wherein, said door assembly is comprised of a pair of folding doors each being pivotally secured about a first axis to said enclosure means proximate opposite sides of said feed opening and extending across said feed opening to a position proximate the middle of said feed opening, said folding doors each being formed of two door panels being pivotally connected to each other for folding about a second axis substantially to said first axis.

4. The animal feeder as defined in claim 3 wherein, said door assembly includes guide means formed for guided lateral movement of said doors along said enclosure means proximate said feed opening.

5. The animal feeder as defined in claim 4 wherein, said door assembly is substantially horizontally oriented, said feed opening is positioned above said feed volume, and spring biasing means coupled to said door assembly and formed to urge said door assembly to said closed position.

6. The animal feeder as defined in claim 1, and releasable latch means formed and mounted to latch said door assembly to said enclosure in said closed position, said latch means being formed for release thereof by latch release means carried by said animal.

7. The animal feeder as defined in claim 6 wherein, said latch means includes a movable element mounted for gravity biased latching of said door assembly, said movable element carrying means formed for cooperation with said latch means to displace said movable element against gravity to unlatch said door assembly.

8. The animal feeder as defined in claim 7 wherein, said latch means and said latch release means include cooperative magnetic elements.

9. The animal feeder as defined in claim 8 wherein, said cooperative magnetic elements are provided by a plurality of permanent magnets mounted to said movable element with magnetic poles oriented in a predetermined orientation, and a plurality of permanent magnets carried by said latch release means with magnetic poles oriented to correspond to said magnets on said movable element in order to displace said movable element against gravity.

10. The animal feeder as defined in claim 7 wherein, said door assembly is substantially horizontally oriented and positioned above said feed volume, said door assembly includes spring biasing means formed to urge said door assembly toward said closed position and guide means formed for guided folding movement of said door assembly, and said movable element is pivotally mounted to said enclosure means for movement into and out of enagement with a portion of said door assembly guided by said guide means.

11. The animal feeder as defined in claim 10 wherein, said door assembly is provided by a pair of folding doors pivotally mounted to said enclosure means proximate opposite sides of said feed opening and articulated at an intermediate position to permit folding of said doors, said doors being further formed with guide elements protruding from the free ends of said doors into said guide means, and said movable element being formed with an opening dimensoned to receive said guide elements to effect latching of said doors in said closed position.

12. A compact, animal-operated animal feeder including enclosure means defining a feed volume and formed with a feed opening therein, barrier means mounted to said enclosure means for movement by said animal from a closed position to an open position, releasable latch means formed to latch said barrier means against opening in said closed position, and latch release means formed for carrying by said animal and formed to release said latch means when positioned proximate said latch means, wherein said improvement comprises:

said barrier means including a pair of folding doors mounted to said enclosure proximate opposite sides of said feed opening and extending across said feed opening to meet proximate the middle of said opening, said doors being mounted to be in a partially folded condition in said closed position so that an inward force by said animal produces lateral folding of said doors away from each other to said open position, said latch means and said latch release means being provided as cooperative magnetic elements formed for displacement of said latch means upon positioning by said animal of said latch release means proximate said latch means.

13. The animal feeder as defined in claim 12 wherein, said barrier means is substantially horizontally oriented above said feed volume, and said barrier means is pivotally mounted for movement away from said feed opening to permit access to said feed volume.

14. An animal entry door including a door assembly having a frame fixably mounted in a building door, wall or the like and barrier means movably mounted in a building door and barrier means movably mounted within said frame for movement by said animal from a closed position to an open position permitting access by said animal through said building door, wherein the improvement comprises:

said barrier means being formed as two articulated door panels, a first door panel movably mounted to said frame and a second door panel movably mounted to said first door panel so that an inward force applied by said animal against said second door panel will move said barrier means to said open position; and releasable latch means formed and mounted to latch said first door panel to said frame in said closed position, said latch means being formed for release thereof by latch release means carried by said animal upon applying an inward force to said second door panel and said latch means includes a movable element pivotally mounted to said frame and carrying means to displace said movable element against gravity to unlatch said barrier means.

15. The animal entry door as defined in claim 14 wherein, said latch means and said latch release means include cooperative magnetic elements, said cooperative magnetic elements being provided by a plurality of permanent magnets mounted to said movable element with magnetic poles oriented in a predetermined orientation, and a plurality of permanent magnets carried by said latch release means with magnetic poles oriented to correspond to said magnets on said movable element in order to displace said movable element against gravity.

16. The animal entry door as defined in claim 14 wherein, said releasable latch means includes a pair of movable latch elements positioned to engage said first door panel on opposite sides thereof to latch said door against movement in either of opposed directions, said latch means further including a movable latch release lever means coupled to said latch elements and formed for simultaneous displacement of said latch elements in a direction preventing unlatching of said first door panel in one direction and effecting unlatching said first door panel in an opposite direction.

* * * * *